United States Patent
Alvarado et al.

(10) Patent No.: US 11,681,337 B2
(45) Date of Patent: Jun. 20, 2023

(54) MODULAR HARD DRIVE RECEIVING CHASSIS MEMBER WITH VIBRATION DAMPING SUPPORTS

(71) Applicant: DELL PRODUCTS, L.P., Round Rock, TX (US)

(72) Inventors: Daniel Alvarado, Plugerville, TX (US); Edmond I. Bailey, Cedar Park, TX (US)

(73) Assignee: Dell Products, L.P., Round Rock, TX (US)

(*) Notice: Subject to any disclaimer, the term of this patent is extended or adjusted under 35 U.S.C. 154(b) by 248 days.

(21) Appl. No.: 16/433,956

(22) Filed: Jun. 6, 2019

(65) Prior Publication Data
US 2019/0286198 A1    Sep. 19, 2019

Related U.S. Application Data

(62) Division of application No. 14/672,845, filed on Mar. 30, 2015, now Pat. No. 10,345,873.

(51) Int. Cl.
G06F 1/18    (2006.01)
G06F 1/20    (2006.01)

(52) U.S. Cl.
CPC ............... G06F 1/187 (2013.01); G06F 1/20 (2013.01); *Y10T 29/49025* (2015.01)

(58) Field of Classification Search
CPC ...... G06F 1/20; G06F 1/187; Y10T 29/49025; Y10T 29/49021; Y10T 29/4902; Y10T 29/49002
USPC .................... 29/603.03, 603.01, 602.1, 592.1
See application file for complete search history.

(56) References Cited

U.S. PATENT DOCUMENTS

| | | | |
|---|---|---|---|
| 3,005,282 A | 10/1961 | Kirk | |
| 4,597,291 A | 7/1986 | Motomiya | |
| 5,229,919 A | 7/1993 | Chen | |
| 5,349,483 A | 9/1994 | Tsai | |
| 5,650,911 A | 7/1997 | Scholder et al. | |
| 5,680,293 A | 10/1997 | McAnally et al. | |
| 5,687,059 A | 11/1997 | Hoppal | |
| 5,734,557 A | 3/1998 | McAnally et al. | |
| 5,783,771 A | 7/1998 | Copeland et al. | |
| 5,837,934 A | 11/1998 | Valavanis et al. | |
| 5,858,509 A | 1/1999 | Polch et al. | |
| 5,865,518 A | 2/1999 | Jarrett et al. | |
| 5,967,633 A | 10/1999 | Jung | |
| 5,995,365 A | 11/1999 | Broder et al. | |
| 6,122,165 A | 9/2000 | Schmitt et al. | |
| 6,125,031 A | 9/2000 | Fiora et al. | |
| 6,195,262 B1 | 2/2001 | Bodette et al. | |
| 6,201,702 B1 | 3/2001 | Schmitt | |

(Continued)

FOREIGN PATENT DOCUMENTS

JP    2009193654 A  *  8/2009    ............. G06F 1/187

*Primary Examiner* — Peter Dungba Vo
*Assistant Examiner* — Azm A Parvez
(74) *Attorney, Agent, or Firm* — Isidore PLLC (57) ABSTRACT

A method of manufacturing a chassis of an HIS includes manufacturing a chassis having a base panel with an upper chassis surface. The method further includes attaching at least one resilient component to the upper chassis surface and that upwardly presents an adhesive surface to fixedly engage and to provide vibration damping for a storage drive that is inserted on the adhesive surface during assembly of the IHS.

19 Claims, 7 Drawing Sheets

(56) References Cited

U.S. PATENT DOCUMENTS

| | | |
|---|---|---|
| 6,297,962 B1 | 10/2001 | Johnson et al. |
| 6,339,532 B1 * | 1/2002 | Boulay .................. G11B 33/08 |
| 6,349,353 B1 | 2/2002 | Lewis et al. |
| 6,351,375 B1 | 2/2002 | Hsieh et al. |
| 6,404,642 B1 | 6/2002 | Greenfield et al. |
| 6,496,366 B1 | 12/2002 | Coglitore et al. |
| 6,580,604 B1 | 6/2003 | McAnally et al. |
| 6,583,950 B2 | 6/2003 | Yoshida et al. |
| 6,600,648 B2 | 7/2003 | Curlee et al. |
| 6,625,033 B1 | 9/2003 | Steinman |
| 6,674,641 B2 | 1/2004 | Jensen et al. |
| 6,675,976 B2 | 1/2004 | Steinman et al. |
| 6,760,219 B2 * | 7/2004 | Hood, III ................ G11B 33/08 |
| | | 361/679.33 |
| 6,788,542 B2 | 9/2004 | Rumney |
| 6,826,048 B1 | 11/2004 | Dean et al. |
| 6,839,233 B2 | 1/2005 | Cravens et al. |
| 6,851,925 B2 | 2/2005 | Chuang |
| 6,854,174 B2 | 2/2005 | Jiang |
| 6,906,918 B2 | 6/2005 | Rabinovitz |
| 7,123,474 B2 | 10/2006 | Cho |
| 7,151,672 B2 | 12/2006 | Campbell |
| 7,245,490 B2 | 7/2007 | Chou et al. |
| 7,259,962 B2 | 8/2007 | Chen |
| 7,262,958 B2 * | 8/2007 | Marroquin ................ G06F 1/20 |
| 7,342,743 B2 | 3/2008 | Kuwajima |
| 7,453,707 B2 | 11/2008 | Beall et al. |
| 7,483,264 B2 | 1/2009 | Chen et al. |
| 7,545,636 B2 | 6/2009 | Wobig et al. |
| 7,580,260 B2 | 8/2009 | Figuerado |
| 7,589,966 B2 | 9/2009 | Ong et al. |
| 7,606,044 B2 | 10/2009 | Bailey et al. |
| 7,623,344 B2 | 11/2009 | Beall et al. |
| 7,639,486 B2 | 12/2009 | Champion et al. |
| 7,821,790 B2 | 10/2010 | Sharma et al. |
| 7,845,903 B2 | 12/2010 | Li |
| 7,909,312 B2 | 3/2011 | Ogata |
| 7,930,812 B2 | 4/2011 | Curnalia et al. |
| 8,045,339 B2 | 10/2011 | Pav |
| 8,054,645 B2 | 11/2011 | Ikeda et al. |
| 8,116,076 B2 | 2/2012 | Cochrane |
| 8,363,414 B2 | 1/2013 | Peng et al. |
| 8,411,432 B1 | 4/2013 | Zimlin et al. |
| 8,427,828 B2 | 4/2013 | Kehret et al. |
| 8,437,133 B2 | 5/2013 | Bhutani et al. |
| 8,451,600 B1 | 5/2013 | Ross |
| 8,665,590 B2 | 3/2014 | Wang |
| 8,755,192 B1 | 6/2014 | Schrempp et al. |
| 8,757,739 B2 | 6/2014 | Chen et al. |
| 8,787,013 B1 | 7/2014 | Czamara et al. |
| 8,787,038 B2 | 7/2014 | Wang et al. |
| 2003/0016504 A1 | 1/2003 | Raynham |
| 2005/0007733 A1 | 1/2005 | Byun et al. |
| 2005/0185370 A1 | 8/2005 | Chung |
| 2006/0120040 A1 | 6/2006 | Chen |
| 2006/0120041 A1 | 6/2006 | Chen |
| 2006/0234090 A1 | 10/2006 | Moriwaki et al. |
| 2006/0274498 A1 | 12/2006 | Chen |
| 2008/0253077 A1 | 10/2008 | Miyamoto et al. |
| 2009/0009961 A1 | 1/2009 | Li |
| 2009/0021912 A1 | 1/2009 | Yin |
| 2009/0152216 A1 | 6/2009 | Champion et al. |
| 2009/0257187 A1 | 10/2009 | Mills et al. |
| 2010/0023976 A1 | 1/2010 | Coles et al. |
| 2010/0026148 A1 | 2/2010 | Zhang et al. |
| 2010/0061051 A1 | 3/2010 | Cochrane |
| 2010/0177487 A1 | 7/2010 | Arshad et al. |
| 2012/0010754 A1 | 1/2012 | Matteson |
| 2012/0063080 A1 | 3/2012 | Chou |
| 2012/0113591 A1 | 5/2012 | Chuang |
| 2012/0188705 A1 * | 7/2012 | Ozeki ..................... G06F 1/187 |
| | | 361/679.35 |
| 2012/0212893 A1 | 8/2012 | Furuta |
| 2012/0219413 A1 | 8/2012 | Charest |
| 2012/0327599 A1 | 12/2012 | Dickinson et al. |
| 2013/0099645 A1 | 4/2013 | Hsieh et al. |
| 2013/0265725 A1 | 10/2013 | Harvilchuck |
| 2014/0055934 A1 | 2/2014 | Wu et al. |
| 2014/0086732 A1 | 3/2014 | Kelaher et al. |
| 2014/0108692 A1 | 4/2014 | Doglio et al. |
| 2014/0113539 A1 | 4/2014 | Dickinson et al. |
| 2014/0211418 A1 | 7/2014 | Arreola |
| 2014/0376172 A1 | 12/2014 | Love et al. |
| 2015/0366096 A1 | 12/2015 | Bailey et al. |
| 2016/0029506 A1 | 1/2016 | Franklin |
| 2016/0291646 A1 | 10/2016 | Alvarado et al. |
| 2016/0360637 A1 | 12/2016 | Harvilchuck et al. |
| 2017/0071071 A1 | 3/2017 | Tseng et al. |

\* cited by examiner

MODULAR HARD DRIVE RECEIVING CHASSIS MEMBER WITH VIBRATION DAMPING SUPPORTS

RELATED APPLICATION

This application is a divisional of U.S. patent application Ser. No. 14/672,845, filed Mar. 30, 2015, the contents of which are fully incorporated herein by reference.

BACKGROUND

1. Technical Field

This disclosure generally relates to information handling systems (IHS), and more particular to a modularly-assembled IHS and a chassis supporting modular assembly of compute components to configure an IHS.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Functional components of an IHS (referred to herein as compute components) are generally provisioned in a chassis during shipping from an original equipment manufacturer (OEM) or during operation at an end user destination. Certain compute components are susceptible to vibration. For example, hard disk storage drives have rotating disks and read heads that can malfunction due to vibrations interfering with delicate mechanisms. The hard disk storage drives are in general more likely to require replacement during the service life of the IHS. Time consuming replacement procedures are undesirable in that these increase the amount of personnel necessary to keep the IHSes in a data center operation as well as potentially increasing unavailability of the IHS during replacement of a storage drive.

BRIEF SUMMARY

The illustrative embodiments of the present disclosure provide a chassis of an information handling system (IHS). In one or more embodiment, the chassis includes a base panel having an upper chassis surface. At least one resilient component is coupled to the upper chassis surface. An upwardly-presented adhesive surface on one or more of the at least one resilient component fixedly engages and to provides vibration damping for a storage drive that is inserted into the IHS.

According to at least one aspect of the present disclosure, an IHS includes a chassis and user selectable compute components, including a storage drive. The chassis includes a base panel having an upper chassis surface. At least one resilient component is coupled to the upper chassis surface. An upwardly presented adhesive surface is provided by/on the at least one resilient component to fixedly engage and provide vibration damping for the storage drive that is inserted during provisioning, servicing or replacement of the IHS with the storage drive.

According to at least one aspect of the present disclosure, a method of manufacturing a chassis of an IHS is provided. In one or more embodiments the method includes manufacturing a chassis having a base panel with an upper chassis surface. The method includes attaching, to the upper chassis surface, at least one resilient component that upwardly presents an adhesive surface utilized to fixedly engage and to provide vibration damping for a storage drive that is inserted/placed on the adhesive surface during assembly of the IHS or servicing or replacement of the IHS storage.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to one or more embodiments, an information handling system (IHS) includes user-selectable compute components including a storage drive. A chassis includes a base panel having an upper chassis surface. At least one resilient component is coupled to the upper chassis surface. An upwardly presented adhesive surface on one or more of the at least one resilient component can fixedly engage and provide vibration damping for a vibration-susceptible compute component that is inserted during provisioning or later modification or repair of the IHS. Connecting cabling interconnects a select compute component and the storage drive.

In one or more embodiments, the present innovation can eliminate the need for positive retention of hard drives using screws and/or clips by providing a modular hard drive support member having a primary surface for vertically receiving one or more hard drives. The modular hard drive support member also includes positional dampeners placed at specific locations on the primary surface, in contact with the lower surface of the hard drive. The positional dampers prevent and/or limit lateral movement of the hard drive from the placed location and absorb and/or substantially reduce vibrations of the drives during drive operation within the chassis. The vibration dampeners can include an adhesive surface that secures the hard drive in place once the drive's bottom surface comes into contact with the dampeners.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
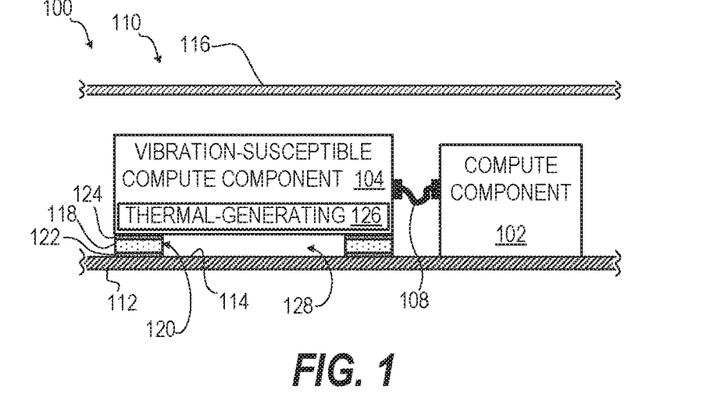
FIG. 1 illustrates a conceptual diagram of an Information Handling System (IHS) with a vibration-susceptible compute component that is protected from vibration by being adhesively attached to a resilient component connected to the chassis, according to one or more embodiments.

FIG. 1 illustrates an example IHS 100 that includes compute components, including at least one vibration susceptible compute component. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For clarity, the IHS 100 is illustrated as including a chassis 110 having located thereon/therein one compute component 102 and one vibration-susceptible compute component 104 interconnected by connecting cabling 108. Also, for simplicity, the singular connection of compute component 102 and vibration-susceptible compute component 104 are described as providing a fully functional IHS 100. In an exemplary embodiment, the vibration-susceptible compute component 104 can be a hard drive mechanism of a storage drive. As provided in the descriptions which follow, vibration-susceptible compute component 104 can be or can include a storage drive, and one or more storage devices are illustrated within the specific examples of vibration-susceptible compute components. However, the functionality described herein can be extended to any other compute component that is vibration-susceptible and requires replacement or direct servicing during the life cycle of the IHS.

Chassis 110 includes (i) a base panel 112 having an upper chassis surface 114 and (ii) a cover 116. Resilient components 118 for dampening vibration are coupled to sections of the upper chassis surface 114. In one embodiment, the resilient components 118 are double-sided adhesive mounting tape 120 with a lower adhesive layer 122 that is directly attached to the upper chassis surface 114. An upper adhesive layer 124 can provide secure engagement to the vibration-susceptible compute component 104 yet allow the vibration-susceptible compute component 104 to be removable by hand for servicing.

The vibration-susceptible compute component 104 can also include a thermal-generating section 126, such as an electromechanical drive motor, than can require cooling. The resilient components 118 can be placed in a small portion of the area under the vibration-susceptible compute component 104 to provide a space beneath the vibration-susceptible compute component 104 that is utilized as an air passage 128 for forced or convective air cooling of vibration-susceptible compute component 104.

Figure 2:
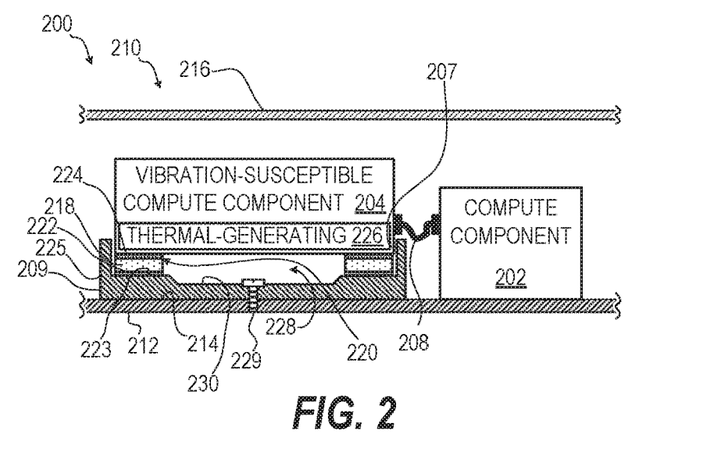
FIG. 2 illustrates a conceptual diagram of an IHS with a vibration-susceptible compute component that is resiliently adhered to a modular support member, according to one or more embodiments.

FIG. 2 illustrates an example IHS 200 having a vibration-susceptible compute component 204 that is positioned in a slot 207 provided by a modular support member 209 affixed to the chassis 210. In one embodiment, the modular support member 209 can be fastened by one or more fasteners 229 to the chassis 210 to provide position retention. Connecting cabling 208 interconnects compute component 202 and the vibration-susceptible component 204. The chassis 210 includes (i) a base panel 212 having an upper chassis surface 214 and (ii) a cover 216. Resilient components 218 for dampening vibration are indirectly coupled to the upper chassis surface 214 via the modular support member 209. In one embodiment, the resilient components 218 are double-sided adhesive mounting tape 220 with a lower adhesive layer 222 that is coupled to the modular support member 209 on the upper chassis surface 214. The lower adhesive layer 222 attaches to a primary surface 223 that defines the slot 207 of the modular support member 209. An upper adhesive layer 224 can provide secure engagement to the vibration-susceptible compute component 204 yet allow the vibration-susceptible compute component 204 to be removable by hand for servicing. Lateral support features 225 are peripherally arranged around the primary surface 223 to positionally guide the location of the vibration-susceptible compute component 204 in the slot.

The vibration-susceptible compute component 204 can also include a thermal-generating section 226, such as an electromechanical drive motor, than can require cooling. The resilient components 218 can be placed around a recess 230 formed in the modular support member 209 to define an air cooling passage 228 under the vibration-susceptible compute component 204 to provide for forced or convective air cooling. In the illustrative embodiments, the vibration-susceptible compute component 204 can be readily installed or replaced without tools.

Figure 3:
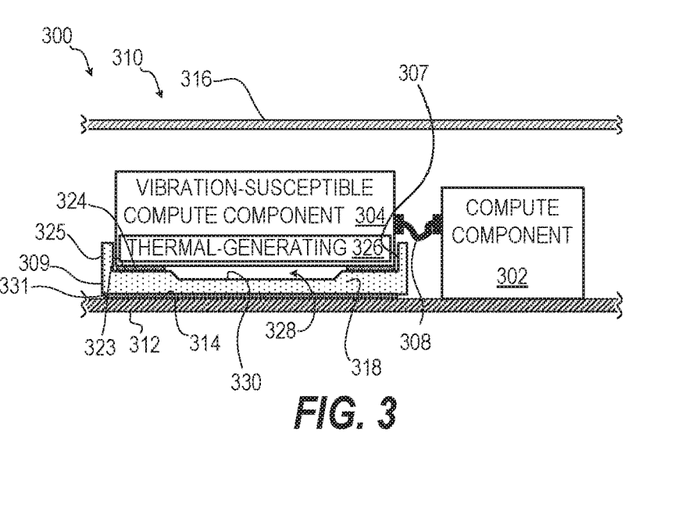
FIG. 3 illustrates a conceptual diagram of an IHS with a vibration-susceptible compute component that is adhered to a modular support member formed of a resilient material, according to one or more embodiments.

FIG. 3 illustrates an example IHS 300 having a vibration-susceptible compute component 304 that is positioned in a slot 307 provided by a modular support member 309 that is formed from resilient material. The modular support member 309 is a resilient component 318 that dampens vibrations. Adhesive layer 324 is adhered to a primary surface 323 that defines the slot 307 of the modular support member 309 for receiving the vibration-susceptible compute component 304 such as a storage drive. The adhesive layer 324 can provide secure engagement to the vibration-susceptible compute component 304 yet allow the vibration-susceptible compute component 304 to be removable by hand for servicing. Connecting cabling 308 interconnects the compute component 302 and the vibration-susceptible compute component 304. Chassis 310 includes (i) a base panel 312 having an upper chassis surface 314 and (ii) a cover 316. Lateral support features 325 are peripherally arranged around the primary surface 323 to positionally guide the vibration-susceptible compute component 304 in the slot. In one embodiment the modular support member 309 can be attached by a bottom adhesive layer 331 to the chassis 310 to provide position retention. The bottom adhesive layer 331 can provide a greater amount of retention force based on its greater surface area and/or can have a greater adherence property than the adhesive layer 324.

The vibration-susceptible compute component 304 can also include a thermal-generating section 326, such as an electromechanical drive motor, than can require cooling. A recess 330 formed in the modular support member 309 can define an air cooling passage 328 under the vibration-susceptible compute component 304 to provide for forced or convective air cooling.

Figure 4:
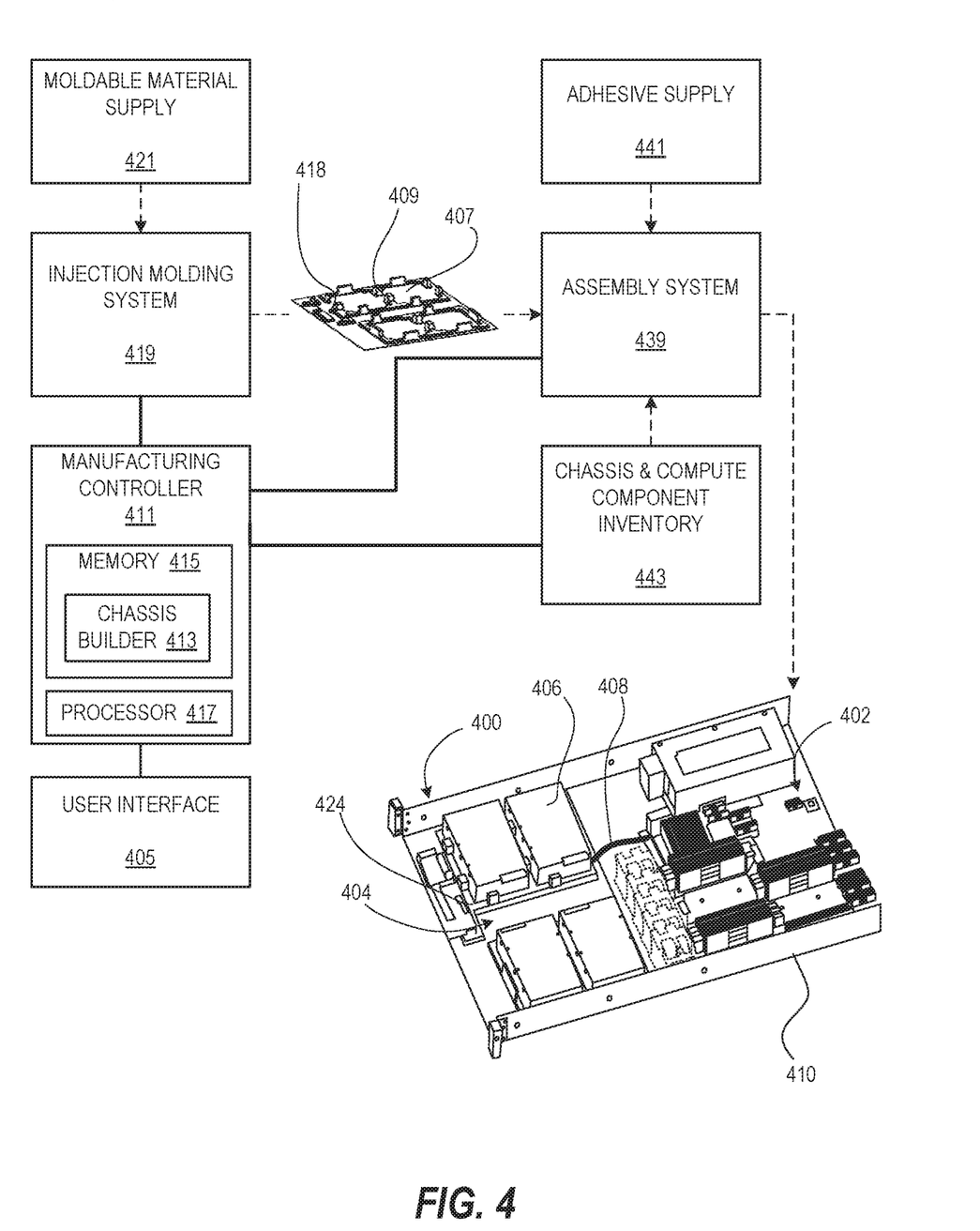
FIG. 4 illustrates a conceptual diagram of an example manufacturing system utilized to form an IHS having a chassis configured with modular support members that allow a vibration-susceptible compute component to be resiliently adhered to the chassis by placement on the support member, according to one or more embodiments.

FIG. 4 illustrates a manufacturing system 401 for manufacturing a chassis of an IHS 400. A manufacturing controller 411 forms a chassis 410 that is configured to house compute components 402 and vibration-susceptible compute components 404 such as storage drives 406. It is appreciated that certain processes of the manufacture can be distributed by location or under separate control. A user interface 405 provides a human interface to the manufacturing controller 411 to initiate execution of a chassis builder 413 contained in memory 415 and executed on a processor 417. An injection molding system 419 can convert molded material from a moldable material supply 421 into a modular support member 409 that includes or is attached to a resilient component 418 with an upper adhesive layer 424. An IHS assembly system 439 can place the upper adhesive layer 424 from an adhesive supply 441 on the modular support member 409. The IHS assembly system 439 can insert the modular support member 409 in the chassis 410 retrieved from a chassis and compute component inventory 443. During assembly of the IHS, an assembler can attach vibration-susceptible compute components 404 to the upper adhesive layer 424. The assembler 439 can attach connecting cables 408 (received, for example, from the chassis and compute component inventory 443) between the storage drive 406 and other compute components 402 in the chassis during assembly of a fully functional IHS 400.

Figure 5:
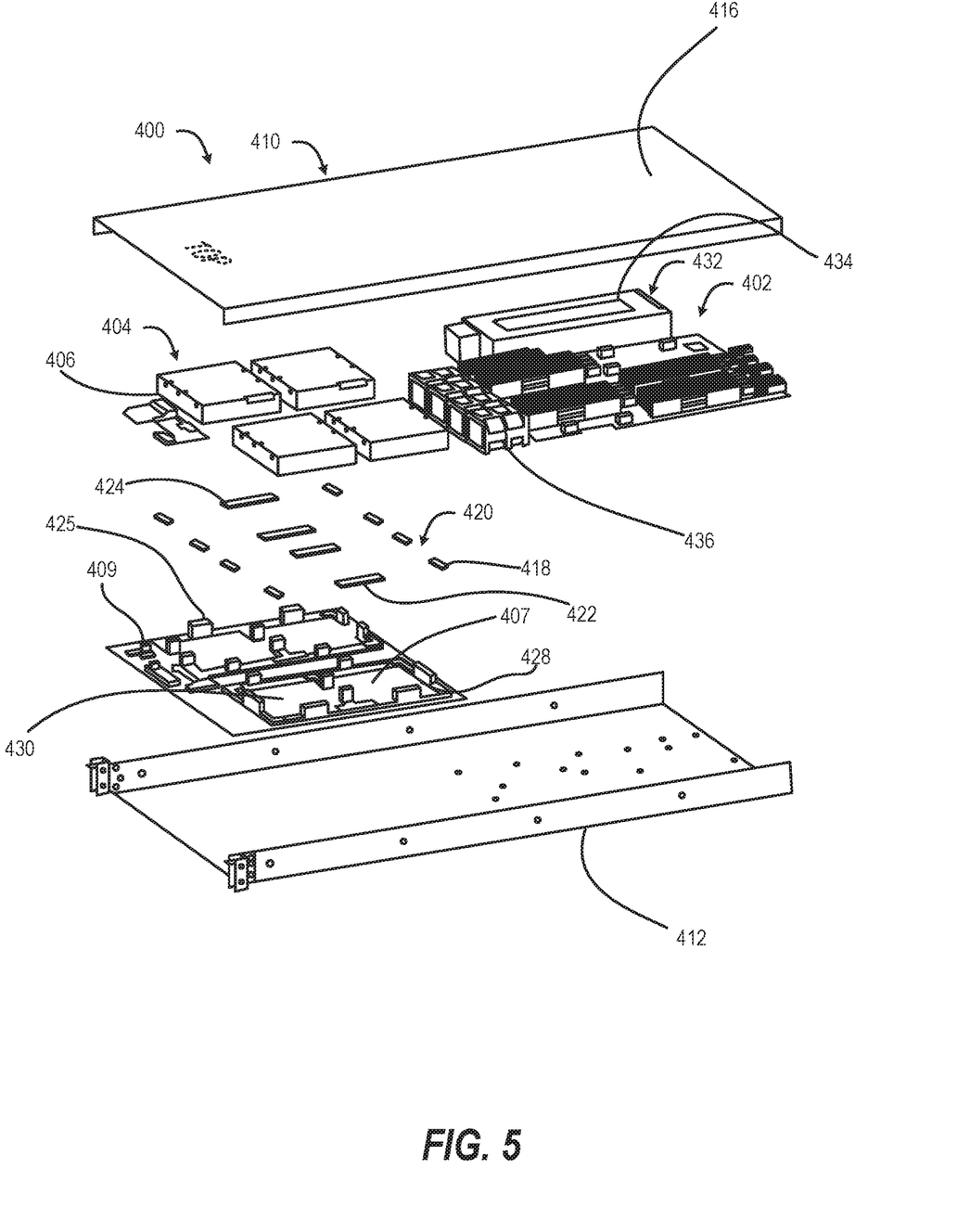
FIG. 5 illustrates a perspective, disassembled view of the IHS of FIG. 4, according to one or more embodiments.

FIGS. 5-8 illustrate the example IHS 400, which includes a modular support member 409 that facilitates expedited placement and replacement of storage drives 406 without tools. The IHS 400 also includes resilient components 418 in the form of double-sided adhesive mounting tape 420 attached to the modular support member 409 and to the storage drive 406 to mitigate damage or malfunction due to vibrations. FIG. 5 illustrates the example IHS 400 as further including a cover 416 that mounts to a base panel 412 of the chassis 410 to enclose the compute components 402. Example IHS 400 also includes storage drives 406, and infrastructure components 432 including a power supply unit (PSU) 434 and fan modules 436. In one or more embodiments, the modular support member 409 can be formed from inexpensive and/or biodegradable materials. Replaceable double-sided adhesive mounting tape 420 can be used to provide a long-lasting but releasable attachment to the storage drives 406 as well as to provide acoustic and shock isolation.

Figure 6:
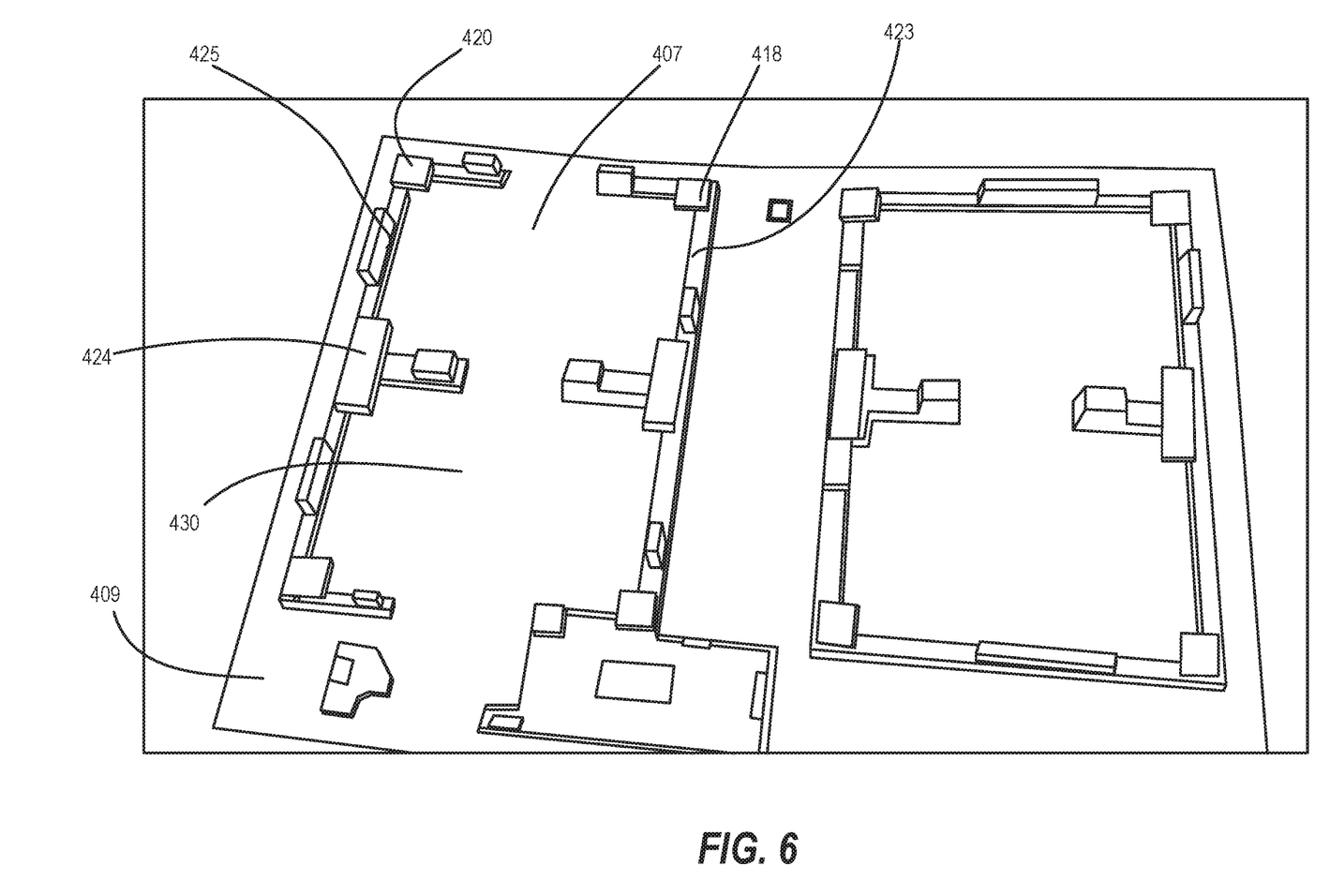
FIG. 6 illustrates a detailed perspective view of a modular support member of the IHS of FIG. 4, according to one or more embodiments.
Figure 7:
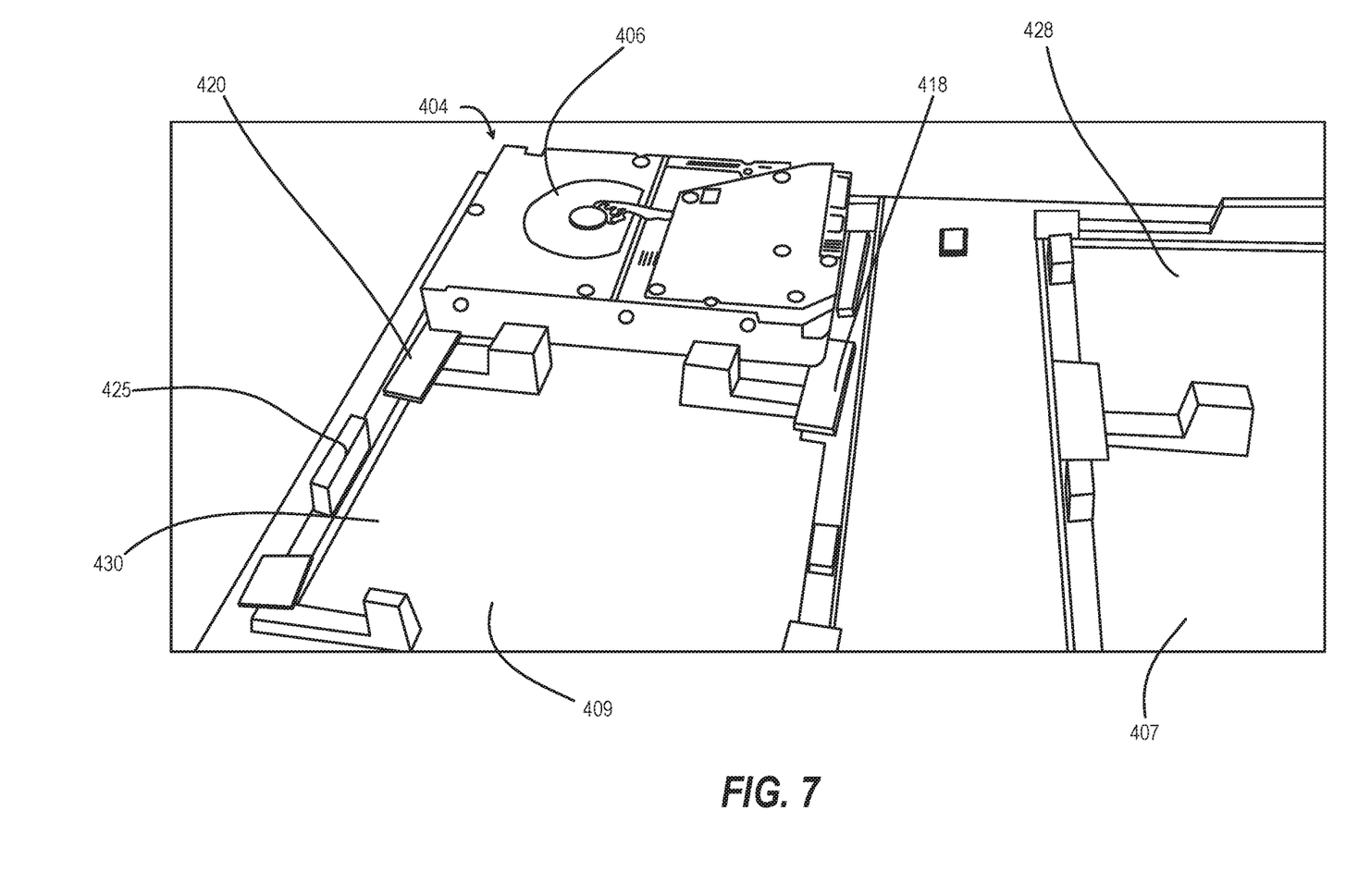
FIG. 7 illustrates a detailed perspective view of the modular support member of FIG. 6 that is supporting a storage device, according to one or more embodiments.
Figure 8:
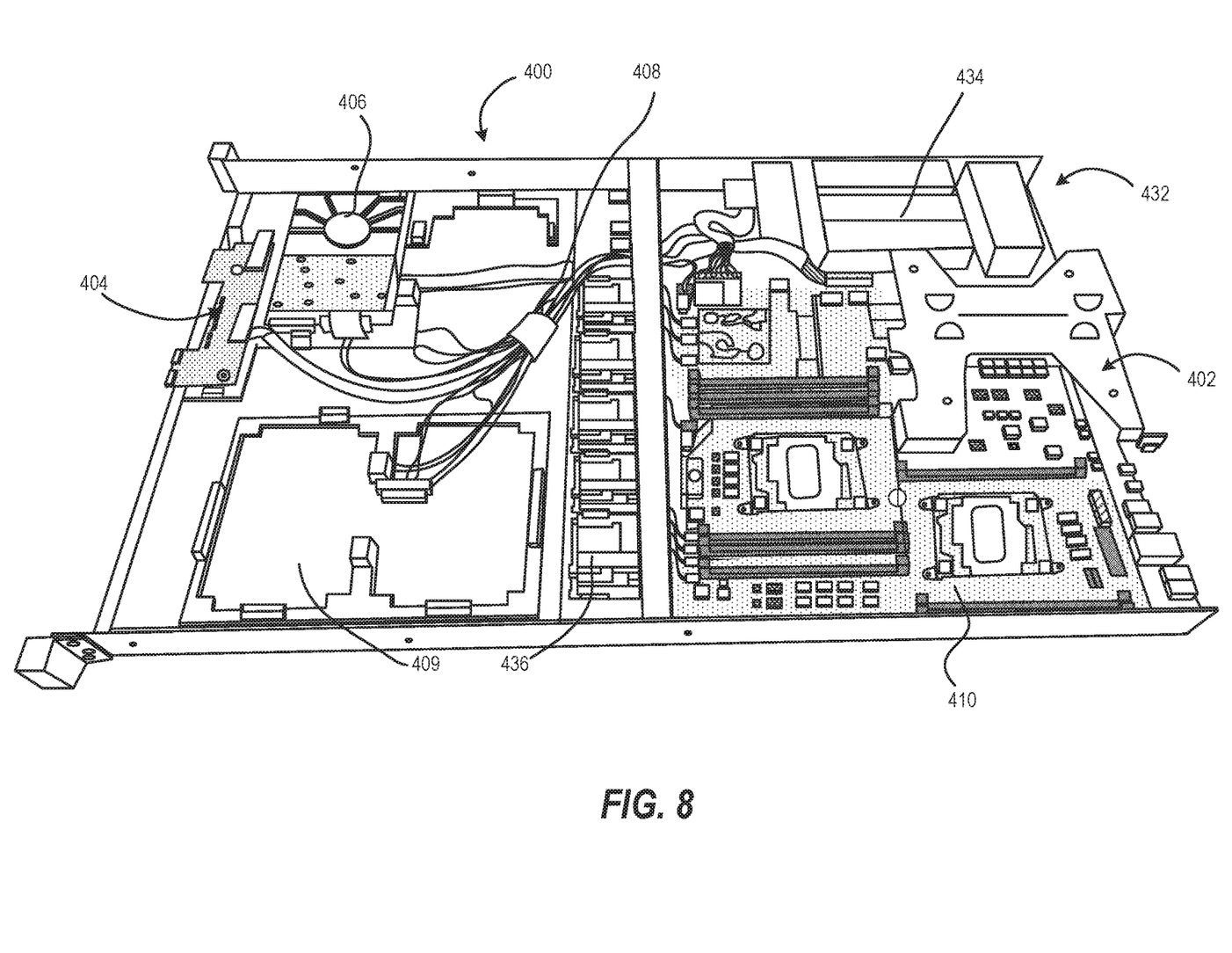
FIG. 8 illustrates a perspective view of the IHS of FIG. 4, according to one or more embodiments.

FIG. 5 illustrates the modular support member 409 having multiple slots 407 defined by peripheral raised primary surfaces 423 that are spaced to underlie the rectangular corners of a storage drive 406 and to receive the double-sided adhesive mounting tape 420. FIGS. 6-7 illustrate that the lateral support features 425 extend upwardly on all four sides to position the storage drive 406 over the slot 407. Air cooling passages 428 are formed between the lateral support features 425 to allow forced or convective air to flow into and out of a recess 430 in each respective slot 407 below an inserted storage drive 406. FIG. 8 illustrates the IHS 400 assembled with a storage drive 406 mounted to a slot 407 on the modular support member 409.

Figure 9:
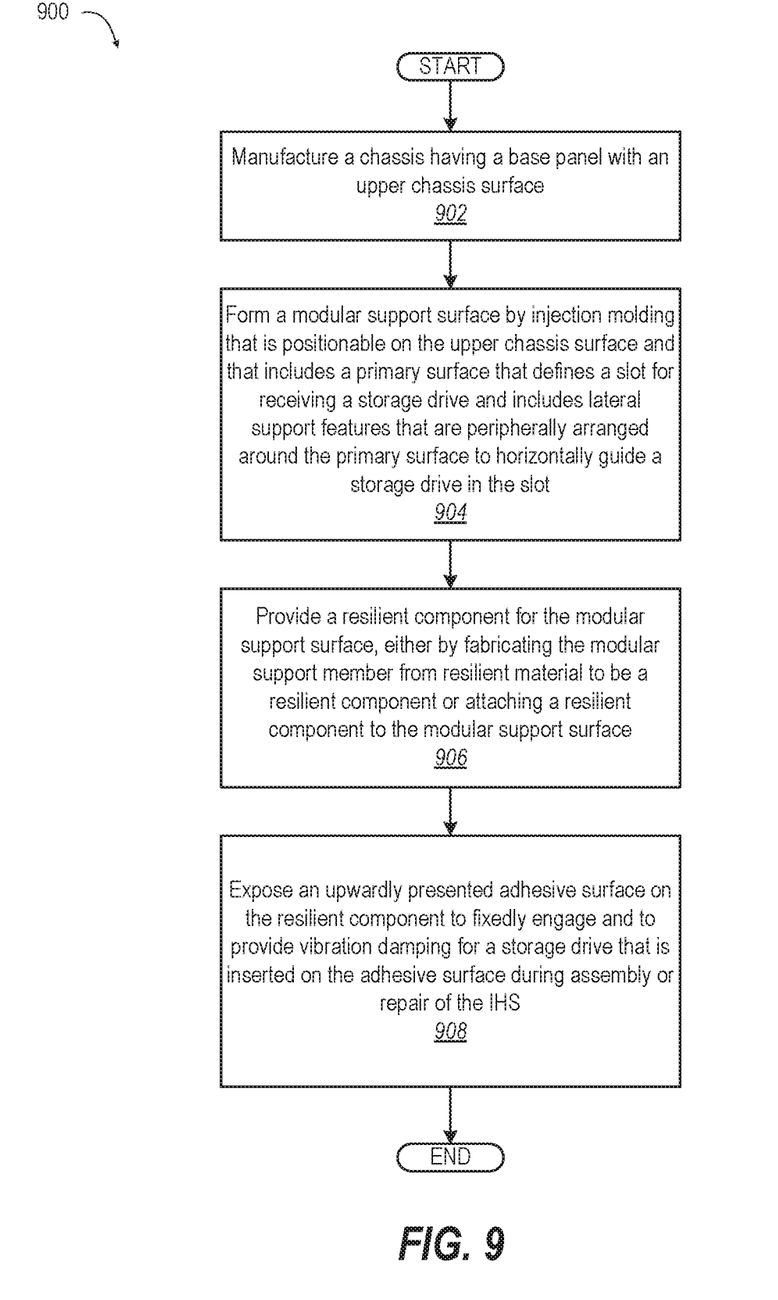
FIG. 9 illustrates a flow diagram of a method of making a chassis of an IHS, according to one or more embodiments.

FIG. 9 illustrates a method 900 of manufacturing a chassis of an IHS. The method 900 begins at start block. In one or more embodiments, the method 900 includes manufacturing a chassis having a base panel with an upper chassis surface (block 902). The method includes forming a modular support surface that is positionable on the upper chassis surface and that includes a primary surface that defines a slot for receiving a storage drive and includes lateral support features that are peripherally arranged around the primary surface to positionally guide the storage drive in the slot. In one embodiment, the modular support surface is formed by injection molding (block 904). The method 900 includes providing a resilient component for the modular support surface, either by fabricating the modular support member from resilient material to become a resilient component or attaching a separate resilient component to the modular support surface (block 906). The method includes exposing and upwardly presenting an adhesive surface on the resilient component to fixedly engage and to provide vibration damping for a storage drive that is inserted on the adhesive surface during assembly or repair of the IHS (block 908). Then, method 900 ends. In one embodiment, the resilient component and the adhesive surface are provided by a double-sided adhesive mounting tape.

In the above described flow chart of FIG. 9, one or more of the methods may be embodied in an automated manufacturing system that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of manufacturing a chassis of an information handling system (IHS), the method comprising:
    providing an IHS chassis with a base panel having an upper chassis surface;
    attaching a modular support member to a section of the upper chassis surface, the modular support member presenting at least one resilient component above the upper chassis surface, the at least one resilient component upwardly presenting an adhesive surface to fixedly engage and to provide vibration damping for a storage drive that is placed on the adhesive surface during assembly of the IHS, the modular support member comprising a primary surface and a plurality of lateral support features that are peripherally arranged and spaced apart around the primary surface and extend upwardly on each side to positionally guide the storage drive into a slot, wherein the modular support member does not enclose the storage device, and enables the storage device to be inserted and retained therein without requiring positive retention using physical screws and/or clips, and wherein air cooling passages are formed between the spaced apart, lateral support features to allow forced or convective air to flow into and out of a recess in eaeh the slot below an inserted storage drive; and wherein the IHS chassis comprises other sections of the upper chassis surface for receiving other compute components of the IHS thereon.

2. The method of claim 1, further comprising:

forming the modular support member to be positionable on the upper chassis surface, the modular support member formed to include the primary surface that defines the slot for receiving the storage drive and the lateral support features; and attaching the at least one resilient component to the primary surface of the modular support member and upwardly presenting the adhesive surface above the at least one resilient component.

3. The method of claim 2, further comprising forming the recess in the primary surface of the modular support member to define an air cooling passage under the storage drive.

4. The method of claim 2, further comprising forming the modular support member by injection molding.

5. The method of claim 1, wherein the modular support member is the at least one resilient component, the modular support member positionable on the upper chassis surface of the base panel, comprises the primary surface that defines the slot for receiving the storage drive and the upwardly presented adhesive surface and lateral support features that are peripherally arranged around the primary surface to positionally guide the storage drive in the slot.

6. The method of claim 5, further comprising forming the recess in the primary surface of the modular support member to define an air cooling passage under the storage drive.

7. A method for manufacturing an information handling system (IHS), the method comprising:

providing a chassis with a base panel having an upper chassis surface; and attaching a modular support member to a section of the upper chassis surface, the modular support member presenting at least one resilient component above the upper chassis surface, the at least one resilient component upwardly presenting an adhesive surface to fixedly engage and to provide vibration damping for a storage drive that is placed on the adhesive surface during assembly of the IHS, the modular support member comprising a primary surface and a plurality of lateral support features that are peripherally arranged and spaced apart around the primary surface and extend upwardly on each side to positionally guide the storage drive into a slot, wherein the modular support member does not enclose the storage device and enables the storage device to be inserted and retained therein without requiring positive retention using physical screws and/or clips, and wherein air cooling passages are formed between the spaced apart, lateral support features to allow forced or convective air to flow into and out of a recess in the slot below an inserted storage drive; and inserting the storage drive into the modular support member, with a base of the storage drive affixed to the upwardly presented adhesive surface; and inserting other compute components on other sections of the upper chassis surface, the other compute components and the storage drive providing a fully functional IHS with thermal-generating sections that require cooling.

8. The method of claim 7, further comprising:

forming the modular support member and positioning the modular support member on the upper chassis surface, the modular support member formed to include the primary surface that defines the slot for receiving the storage drive, the modular support member having the upwardly presented adhesive surface and the lateral support features; and attaching the at least one resilient component to the primary surface of the modular support member and upwardly presenting the adhesive surface above the at least one resilient component.

9. The method of claim 8, further comprising forming the recess in the primary surface of the modular support member to define an air cooling passage under the storage drive, the recess enabling forced or convective air cooling of the inserted storage drive.

10. The method of claim 8, wherein the modular support member comprises positional dampeners placed at specific locations on the primary surface and which are in contact with a lower surface of an inserted vibration-susceptible computer component, the positional dampeners limiting lateral movement of the inserted vibration-susceptible computer component from a placed location and absorbing and substantially reducing vibrations of the vibration-susceptible computer component during operation within the chassis.

11. The method of claim 7, wherein at least one of the at least one resilient component and the upwardly presented adhesive surface comprise double-sided adhesive mounting tape and the attaching of the at least one resilient component and the upwardly presenting of the adhesive surface comprise attaching double-sided adhesive mounting tape to an upper surface of the modular support member.

12. The method of claim 1, wherein upwardly presenting the adhesive surface above the at least one resilient component comprises attaching double-sided adhesive mounting tape to an upper surface of the modular support member.

13. The method of claim 1, wherein the attaching a modular support member to the upper chassis surface comprises attaching the modular support member to the upper chassis surface by one of (a) one or more fasteners or (b) a bottom adhesive layer to provide position retention.

14. The method of claim 1, further comprising fabricating the modular support member from resilient material to become a resilient component.

15. The method of claim 2, wherein the at least one resilient component and the upwardly presented adhesive surface comprise double-sided adhesive mounting tape and the attaching of the at least one resilient component and the upwardly presenting of the adhesive surface comprise attaching double-sided adhesive mounting tape to the primary surface of the modular support member.

16. The method of claim 7, wherein upwardly presenting the adhesive surface above the at least one resilient component comprises attaching double-sided adhesive mounting tape to an upper surface of the modular support member.

17. The method of claim 7, wherein the attaching a modular support member to the upper chassis surface comprises attaching the modular support member to the upper chassis surface by one of (a) one or more fasteners or (b) a bottom adhesive layer to provide position retention.

18. The method of claim 7, further comprising fabricating the modular support member from resilient material to become a resilient component.

19. The method of claim 8, wherein the at least one resilient component and the upwardly presented adhesive surface comprise double-sided adhesive mounting tape and the attaching of the at least one resilient component and the upwardly presenting of the adhesive surface comprise attaching double-sided adhesive mounting tape to the primary surface of the modular support member.

\* \* \* \* \*